(12) United States Patent
Nagai

(10) Patent No.: US 6,201,660 B1
(45) Date of Patent: Mar. 13, 2001

(54) MAGNETIC RECORDING/REPRODUCING APPARATUS

(75) Inventor: Seiichi Nagai, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/094,063

(22) Filed: Jun. 9, 1998

(30) Foreign Application Priority Data

| Jun. 10, 1997 | (JP) | 9-152220 |
| Jun. 17, 1997 | (JP) | 9-159685 |
| Jun. 17, 1997 | (JP) | 9-159686 |

(51) Int. Cl.$^7$ ................................................. G11B 5/008
(52) U.S. Cl. ................................. 360/96.5; 360/69
(58) Field of Search ........................ 360/69, 96.5, 96.4, 360/96.6, 96.1, 93, 130.2, 130.3, 130.31, 130.32

(56) References Cited

U.S. PATENT DOCUMENTS

| 5,272,579 | 12/1993 | Ohkubo et al. . |
| 5,371,642 | 12/1994 | Bryer . |
| 5,373,406 | 12/1994 | Jansen . |
| 5,448,432 | 9/1995 | Saga et al. . |
| 5,557,485 | 9/1996 | Stephens et al. . |

FOREIGN PATENT DOCUMENTS

| 565 770 A2 | 10/1993 | (EP) . |
| 633 567 A2 | 1/1995 | (EP) . |
| WO 98/18124 | 4/1998 | (NL) . |
| WO 95/34068 | 12/1995 | (WO) . |

*Primary Examiner*—Muhammad Edun
(74) *Attorney, Agent, or Firm*—Brinks Hofer Gilson & Lione

(57) ABSTRACT

According to the structure of a conventional magnetic recording/reproducing apparatus, the loading and unloading of a cartridge are effected by pushing the cartridge into the apparatus manually against the biasing force of a plate spring which serves as a cartridge holding member, thus requiring a large force (about 0.5 to 1 Kgf) for the cartridge loading and unloading operation. In the magnetic recording/reproducing apparatus of the present invention, a slide member having retaining rollers is attached to a housing slidably and the retaining rollers are brought into engagement with engaging portions of a cartridge. In this state the slide member is allowed to slide to effect loading and unloading of the cartridge.

9 Claims, 14 Drawing Sheets

MAGNETIC RECORDING/REPRODUCING APPARATUS

BACKGROUND OF THE INVENTION

1. Field of the Invention

The present invention relates to a magnetic recording/reproducing apparatus. Particularly, the invention is concerned with a loading and unloading mechanism for a cartridge with a magnetic tape received therein.

2. Description of the Prior Art

A conventional magnetic recording/reproducing apparatus 21 will be described below with reference to FIG. 24 which is a plan view of the apparatus, FIG. 25A which is a sectional view taken on line A—A in FIG. 24, and FIG. 25B which is a side view of a principal portion thereof.

In the conventional magnetic recording/reproducing apparatus 21 (hereinafter referred to as the "apparatus 21"), a pair of guide members 21b and 21c each having a U-shaped groove are attached in an opposed relation to each other to right and left side faces of a base plate 21a.

In the vicinity of the guide members 21b and 21c, openings 21d are formed in portions of the base plate 21a, as shown in FIG. 25A.

On the back of the base plate 21a are mounted a pair of plate springs 22 having a strong resilience, the plate springs 22 being screwed at one end thereof and free at the opposite end. At the tip of the free end of each plate spring 22 is formed a retaining portion 22a and a roller 22b is supported rotatably by the retaining portion 22a.

The roller 22b is inserted into the associated opening 21d of the base plate 21a. When a strong depressing force is applied to the roller 22b, the strong resilience of the plate spring 22 permits the roller 22b to move vertically within the opening 21d with the foregoing screwed portion of the plate spring as fulcrum.

A cartridge 23, with a magnetic tape 23a accommodated therein, has guide grooves 23b formed in both side faces thereof, as shown in FIG. 25B. The guide grooves 23b are guided by the guide members 21b and 21c to conduct the cartridge 23 into the apparatus 21.

In portions of a bottom plate 23c which constitutes the guide grooves 23b of the cartridge 23 there are formed cutout portions 23d.

For loading the cartridge 23 into the apparatus 21, first the front end portion of the cartridge is inserted manually in the direction of arrow B from an inlet 21e of the apparatus.

As a result, the front end portion of the bottom plate 23c of the cartridge 23 comes into abutment with the rollers 22b. But if the cartridge 23 is pushed into the apparatus 21 with a stronger force, the plate springs 22 deflect downward, whereby the rollers 22b are forced down.

By virtue of the resilience of the plate springs 22 the rollers 22b come into elastic contact with one end of each of the cutout portions 23d.

In this way one end of each of the cutout portions 23d is pressed in the direction of arrow A (45°) by the rollers 22b, whereby the cartridge 23 is held in the interior of the apparatus 21 while it is prevented from coming off the apparatus. In this state, a magnetic head 24 and the magnetic tape 23a are in abutment with each other, now ready for recording and reproduction.

For unloading the cartridge 23 from the apparatus 21, the operator is required to pull a rear end portion 23e of the cartridge, which projects from the inlet 21e to the exterior of the apparatus, manually in the direction of arrow C against the biasing force of the plate springs 22, allowing the rollers 22b to be disengaged from the cutout portions 23d of the cartridge 23, whereby the cartridge can be removed from the apparatus 21.

In the above conventional apparatus 21, however, since the loading and unloading of the cartridge 23 are performed by hand, a fairly strong force (about 0.5 to 1 Kgf) is required against the biasing force of the plate springs 22. In order to facilitate the loading and unloading of the cartridge 23, the resilience of the plate spring 22 may be weakened, but in this case the force for holding the cartridge in the apparatus 21 becomes weaker, and when vibration or the like is exerted on the apparatus from the exterior, the magnetic tape 23a, which is in sliding contact with the magnetic head 24, may move, or the cartridge 23 may no longer be held in place. Once such a state occurs, it may become impossible to effect accurate recording and reproduction.

SUMMARY OF THE INVENTION

For solving the above-mentioned problems, according to the present invention there is provided, in the first aspect thereof, a magnetic recording/reproducing apparatus including a loading and unloading mechanism which makes it possible for a cartridge with a magnetic tape received therein to be loaded and unloaded with respect to the apparatus, also including a slide member capable of engaging the cartridge, and further including a housing for holding the slide member, the loading and unloading of the cartridge being effected by sliding the slide member in an engaged state thereof with the cartridge.

In the second aspect of the present invention there is provided, in combination with the apparatus in the first aspect, magnetic recording/reproducing apparatus wherein the slide member is held slidably with respect to the housing and in such a manner that when the slide member lies on a cartridge inlet side, engaging portions thereof for engagement with the cartridge can be engaged with and disengaged from the cartridge in a direction orthogonal to the sliding direction.

In the third aspect of the present invention there is provided, in combination with the apparatus in the second aspect, a magnetic recording/reproducing apparatus wherein the engagement of the slide member with the cartridge is effected by engagement of retaining portions formed as protuberances on the slide member side with engaging grooves formed on the cartridge side, the retaining portions of the slide member being displaceable vertically with respect to the sliding direction.

In the fourth aspect of the present invention there is provided, in combination with the apparatus in the third aspect, a magnetic recording/reproducing apparatus wherein the retaining portions of the slide member are constituted by rollers supported on one end side of the slide member.

In the fifth aspect of the present invention there is provided, in combination with the apparatus in the fourth aspect, a magnetic recording/reproducing apparatus wherein the slide member is formed with stoppers at positions near the rollers, the stoppers being higher than the rollers.

In the sixth aspect of the present invention there is provided, in combination with the apparatus in the second aspect, a magnetic recording/reproducing apparatus wherein the housing is provided with cam portions to displace the slide member into engagement with and disengagement from the cartridge.

In the seventh aspect of the present invention there is provided, in combination with the apparatus in the sixth aspect, a magnetic recording/reproducing apparatus wherein the cam portions are formed integrally with the housing by projecting portions of the housing downward.

In the eighth aspect of the present invention there is provided, in combination with the apparatus in the fourth aspect, a magnetic recording/reproducing apparatus wherein when the rollers are positioned on the lower side with a vertical motion of the slide member, the rollers come into contact with end portions of the engaging grooves of the cartridge to lock the cartridge temporarily.

In the ninth aspect of the present invention there is provided, in combination with the apparatus in any of the first to seventh aspects, a magnetic recording/reproducing apparatus wherein the housing is provided with a drive source and a rotary cam mechanism connected to the drive source, and the slide member is driven electrically by the rotary cam mechanism.

In the tenth aspect of the present invention there is provided, in combination with the apparatus in any of the first to eighth aspects, a magnetic recording/reproducing apparatus wherein in a cartridge loading position the whole of the cartridge is loaded completely into the housing.

In the eleventh aspect of the present invention there is provided a magnetic recording/reproducing apparatus including a loading and unloading mechanism which makes it possible for a cartridge with a magnetic tape received therein to be loaded and unloaded with respect to the apparatus, also including a slide member capable of engaging the cartridge, further including an electric drive means for sliding the slide member, a housing for holding the slide member, and a sensor for detecting that the cartridge has been inserted into the housing, wherein when it is detected by the sensor that the cartridge has been inserted into the housing, the electric drive means is operated to start sliding of the slide member for completing the loading of the cartridge.

In the twelfth aspect of the present invention there is provided, in combination with the apparatus in the eleventh aspect, a magnetic recording/reproducing apparatus wherein the housing is provided with a slidable opening member for opening a lid of the cartridge and wherein, after the cartridge has been inserted and its lid opened by the opening member, the opening member is allowed to slide with a further cartridge inserting motion, and this sliding of the opening member is detected by the sensor to detect that the cartridge has been inserted, whereupon the operation of the electric drive means is started.

In the thirteenth aspect of the present invention there is provided, in combination with the apparatus in the eleventh aspect, a magnetic recording/reproducing apparatus wherein an opening member for opening a lid of the cartridge is fixed to the housing and wherein, when it is detected by the sensor that the lid has been opened and that the cartridge has been inserted, the operation of the electric drive means is started.

In the fourteenth aspect of the present invention there is provided, in combination with the apparatus in the eleventh aspect, a magnetic recording/reproducing apparatus wherein the slide member is held slidably with respect to the housing and in such a manner that when the slide member lies on a cartridge inlet side, engaging portions thereof for engagement with the cartridge are movable in a direction orthogonal to the sliding direction.

In the fifteenth aspect of the present invention there is provided, in combination with the apparatus in the fourteenth aspect, a magnetic recording/reproducing apparatus wherein the engagement of the slide member with the cartridge is effected by engagement of retaining portions constituted by rollers with engaging grooves formed in the cartridge, the said rollers being supported on one end side of the slide member and displaceable vertically with respect to the sliding direction.

In the sixteenth aspect of the present invention there is provided, in combination with the apparatus in the fifteenth aspect, a magnetic recording/reproducing apparatus wherein the slide member is formed with stoppers at positions near the rollers, the stoppers being higher than the rollers In the seventeenth aspect of the present invention there is provided, in combination with the apparatus in any of the eleventh to thirteenth aspects, a magnetic recording/reproducing apparatus wherein the electric drive means comprises a motor and a transfer mechanism.

In the eighteenth aspect of the present invention there is provided a magnetic recording/reproducing apparatus including a loading and unloading mechanism which makes it possible for a cartridge with a magnetic tape received therein to be loaded and unloaded with respect to the apparatus, also including a slide member capable of engaging the cartridge, and further including a housing for holding the slide member, wherein the slide member is provided with a stopper mechanism for stopping the cartridge at a position of engagement with the slide member upon insertion of the cartridge into the apparatus and which stopper mechanism, when the slide member is pulled in, permits movement of the cartridge while maintaining the engaged state of the cartridge with the slide member.

In the nineteenth aspect of the present invention there is provided, in combination with the apparatus in the eighteenth aspect, a magnetic recording/reproducing apparatus wherein the stopper mechanism is formed integrally with the slide member.

DETAILED DESCRIPTION OF THE PREFERRED EMBODIMENTS

Figure 1:
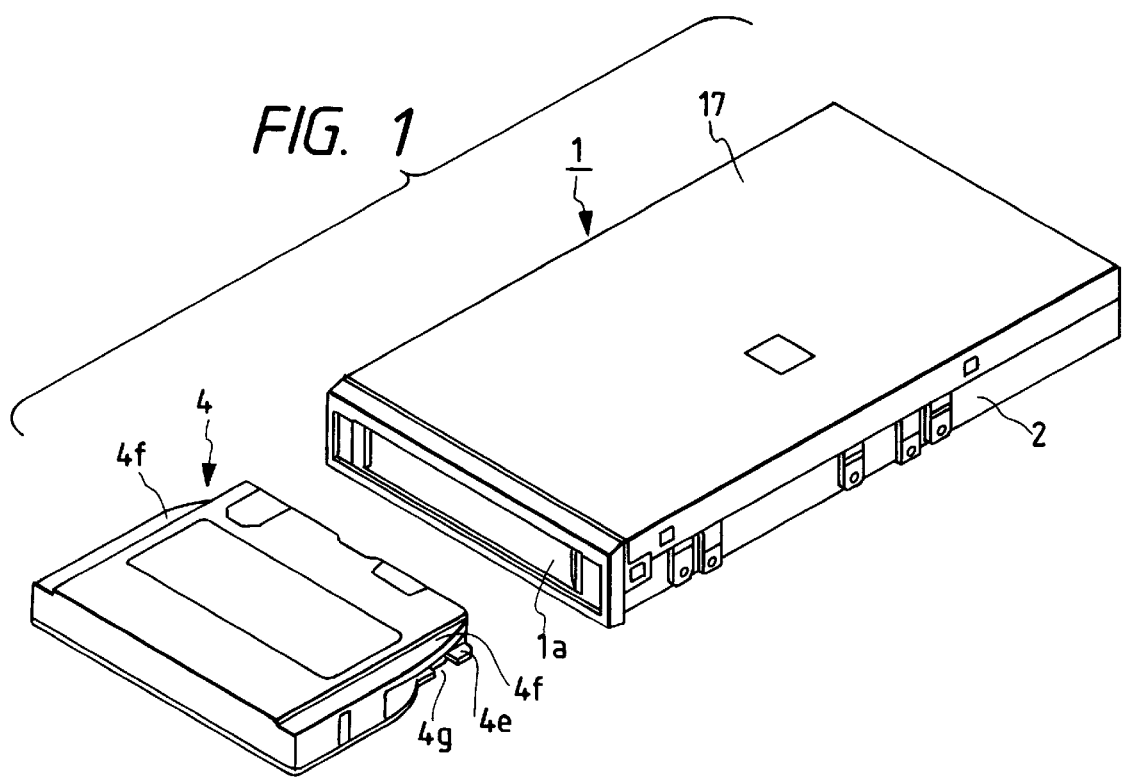
FIG. 1 is an explanatory view showing the whole of a magnetic recording/reproducing apparatus according to an embodiment of the present invention.
Figure 2:
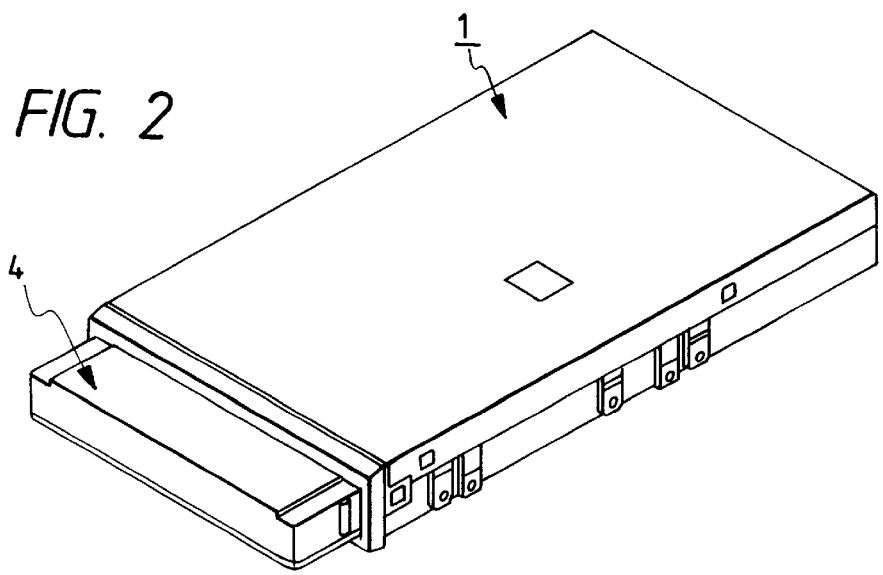
FIG. 2 is an explanatory view showing a completed state of cartridge loading in the magnetic recording/reproducing apparatus.

Magnetic recording/reproducing apparatus embodying the present invention will now be described with reference to FIGS. 1 to 23. As shown in FIGS. 1 and 2, a magnetic recording/reproducing apparatus 1 (hereinafter referred to as the apparatus 1) substantially comprises a housing 2 which is generally rectangular in external shape and in the interior of which are mounted various components to be described later, and a cover 17 for closing an upper portion of the housing 2, with a cartridge inlet 1a being formed in a front portion of the housing.

At side faces of a cartridge 4, which accommodates a magnetic tape therein and which is to be loaded into the apparatus 1, there are formed guide portions 4f and 4e in an up-and-down relation to each other for guiding the cartridge into the apparatus 1. In the lower guide portions 4e are formed engaging grooves 4g for engagement and locking therein of retaining portions 3e of a slide member 3. FIG. 2 is an appearance view at completed loading of the cartridge 4 into the apparatus 1 with the retaining portions of the slide member engaged in the grooves 4g.

A more detailed construction of the apparatus 1 will be described with reference to FIGS. 3 to 10.

The housing 2 is constituted by a metallic plate for example. As shown in a plan view of FIG. 3, the housing 2 is formed in a rectangular external shape and it comprises a bottom plate 2a and side plates 2b, 2b formed oppositely to each other by bending the bottom plate 2a upward (to this side perpendicularly to the paper surface of FIG. 3).

Figure 4:
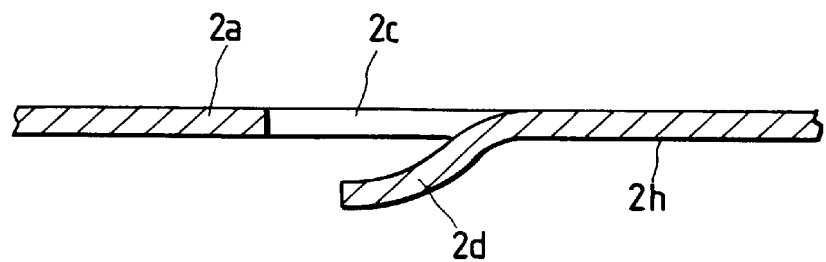
FIG. 4 is a sectional view showing a principal part of a cam portion of the housing illustrated in FIG. 3.

In two right and left positions of the bottom plate 2a are punched a pair of openings 2c, 2c with a press or the like. In the openings 2c, 2c are formed tongue-like cam portions 2d, 2d, respectively, to constitute inclined portions projecting obliquely downward from the bottom plate 2a, as shown in FIG. 4.

Thus, portions of the housing 2 are projected to the back side of the bottom plate 2a to form the cam portions 2d as the above inclined portions integral with the housing.

Figure 3:
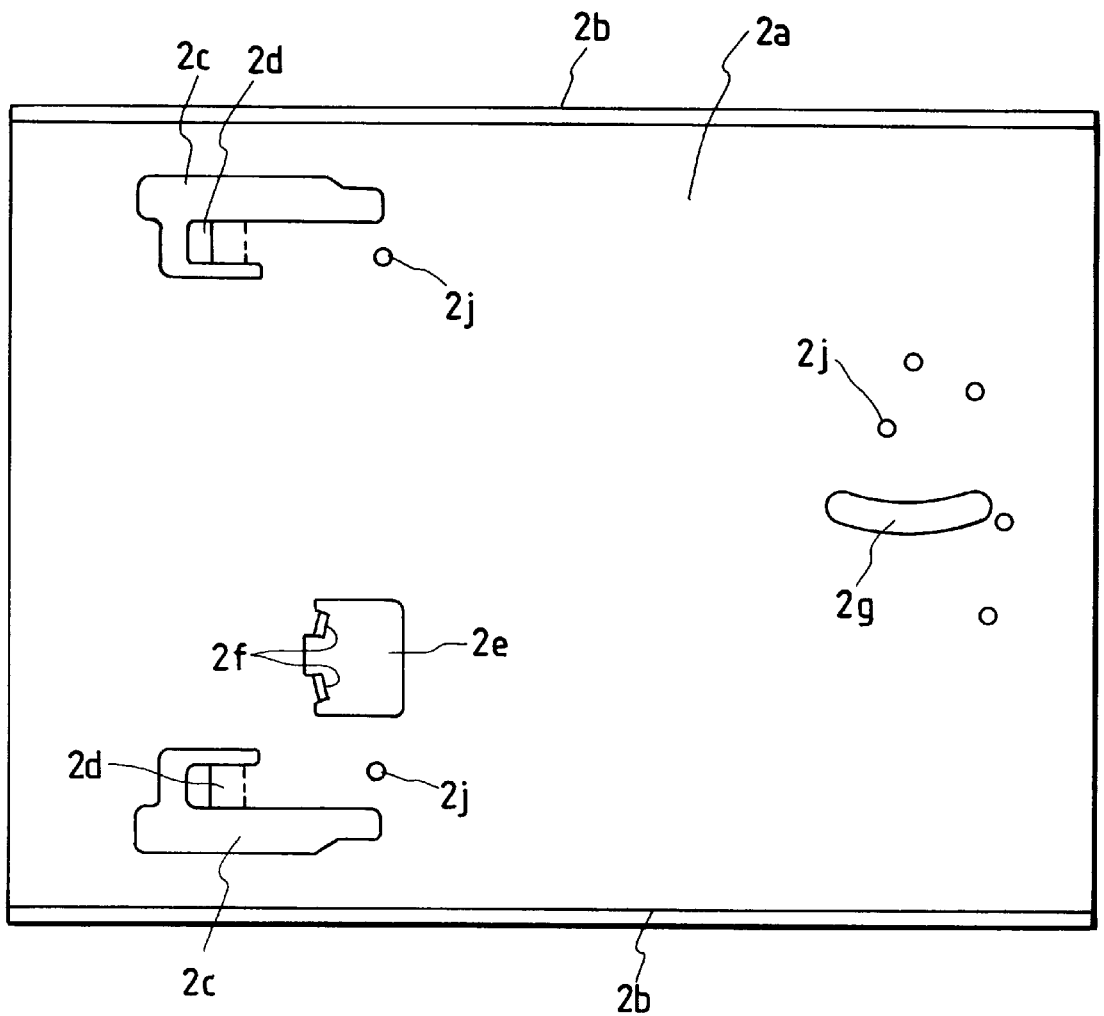
FIG. 3 is a plan view of a housing used in the magnetic recording/reproducing apparatus.

Between the two openings 2c, 2c shown in FIG. 3 is formed a head mounting hole 2e by punching. At positions adjacent to the head mounting hole 2e are formed two stoppers 2f by cutting and raising portions of the bottom plate 2a upward (to this side perpendicularly to the paper surface of FIG. 3).

Further, an arcuate guide slot 2g is formed through the bottom plate 2a.

Rivet mounting apertures 2j are formed in the bottom plate 2a at positions near the openings 2c, 2c and also near the guide slot 2g. Additionally, around the guide slot 2g are formed a plurality of circular apertures of a small diameter.

The slide member 3 is disposed in contact with a back side 2h of the bottom plate 2a.

The slide member 3 is constituted by a metallic plate having resilience such as a stainless steel plate. As shown in a perspective view of FIG. 5, the slide member 3 is generally U-shaped in external form and comprises a base portion 3a and arm portions 3b, 3c extending forward from both right and left sides of the base portion 3a.

Tips of the arm portions 3b and 3c are bent upward at right angles from the outside to form a pair of roller holding portions 3d in an opposed relation to each other.

Retaining portions are formed respectively at the tips of the paired roller holding portions 3d, 3d. The retaining portions are constituted respectively by metallic, retaining rollers 3e, 3e which are supported rotatably by shafts.

Figure 5:
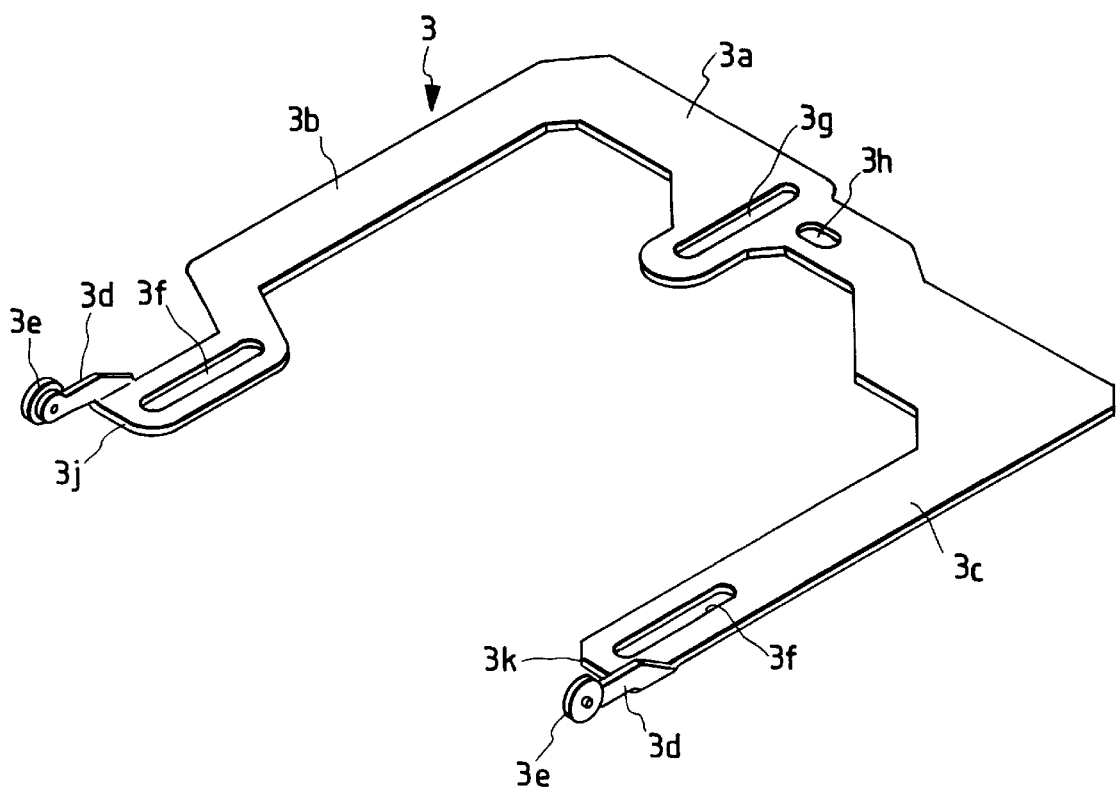
FIG. 5 is a perspective view of a slide member used in the magnetic recording/reproducing apparatus.

In the vicinity of the roller holding portions 3d and through the arm portions 3b, 3c are formed elongated sliding slots 3f, 3f respectively by punching so that their longitudinal directions are parallel to each other. Nearly centrally of the base portion 3a is also formed a sliding slot 3g by punching in a direction parallel to the sliding slots 3f. On the right-hand side of the sliding slot 3g in FIG. 5 is formed an elliptical aperture 3h in a direction orthogonal to the sliding slot 3g.

The arm portions 3b and 3c are of the same length and their front ends 3j and 3k are formed in a rectilinear shape. The roller holding portions 3d, 3d extend forward beyond the front ends 3j and 3k.

Figure 9:
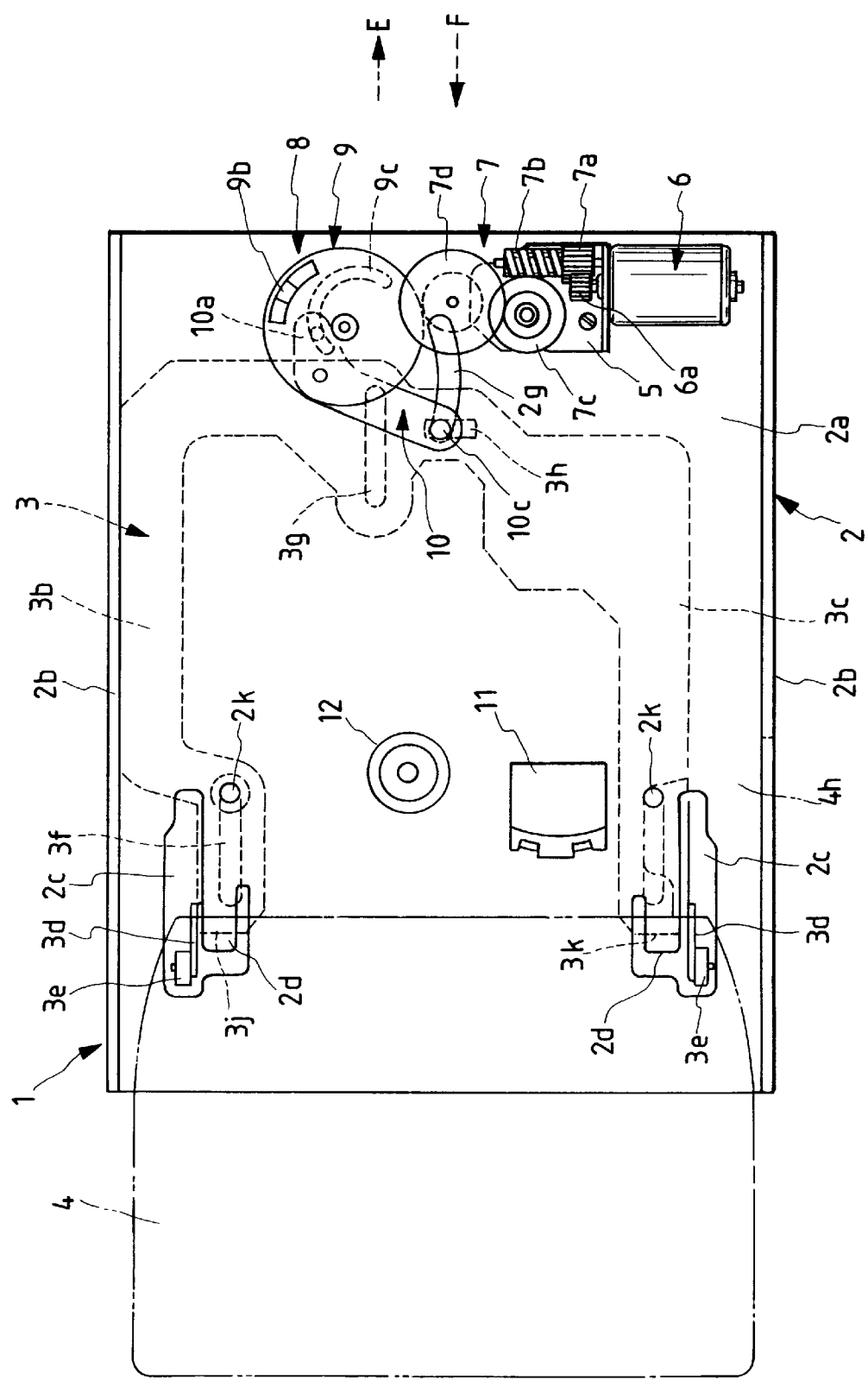
FIG. 9 is a plan view of principal portions in a waiting state for cartridge loading in the magnetic recording/reproducing apparatus.
Figure 10:
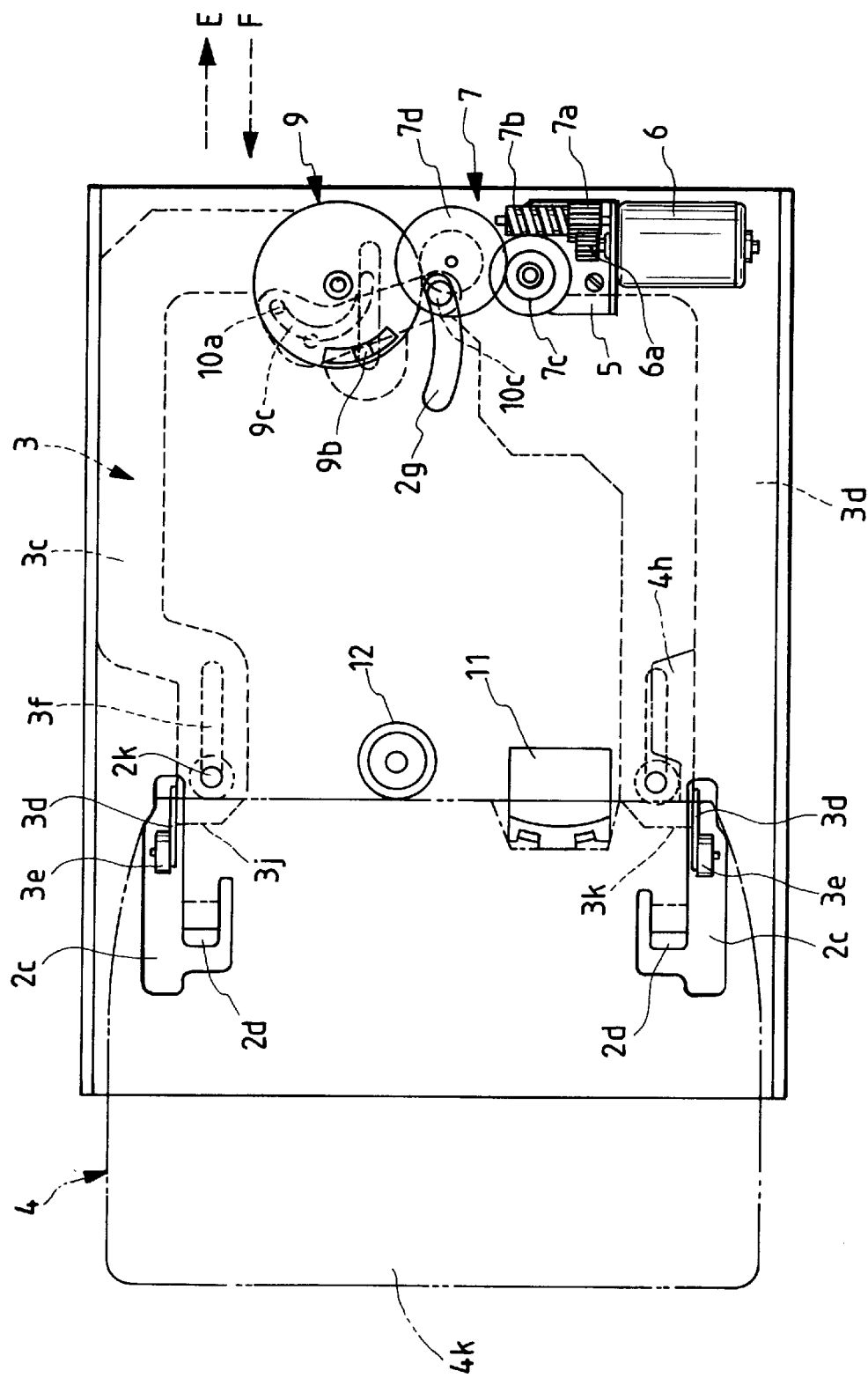
FIG. 10 is a plan view of principal portions in a cartridge loaded state in the magnetic recording/reproducing apparatus.

As shown in FIGS. 9 and 10, the slide member 3 of such a construction is mounted slidably to the back side 2h of the bottom plate 2a of the housing 2 with rivets 2K.

For mounting the slide member 3 to the back side of the bottom plate 2a, the housing 2 shown in FIG. 3 is turned inside out so that the back side 2h faces up. Then, the roller holding portions 3d of the slide member 3 with the retaining rollers 3e attached thereto are aligned with the two openings 2c of the bottom plate 2a and inserted therein. Then, alignment is made so that the front ends 3j and 3k of the slide member 3 do not strike on the slants of the cam portions 2d of the bottom plate 2a.

Further, the three rivet mounting apertures 2j are aligned respectively with the sliding slots 3f, 3f and 3g formed in the slide member 3, and the tips of rivets 2k having head portions of a diameter larger than the width of each sliding slot are inserted into those sliding slots and rivet mounting apertures.

The rivets 2k thus inserted into the rivet mounting apertures 2j of the housing 2 are then caulked and fixed to the bottom plate 2a with a caulking jig (not shown), whereby the slide member 3 is attached slidably to the back side 2h of the housing 2.

Figure 6:
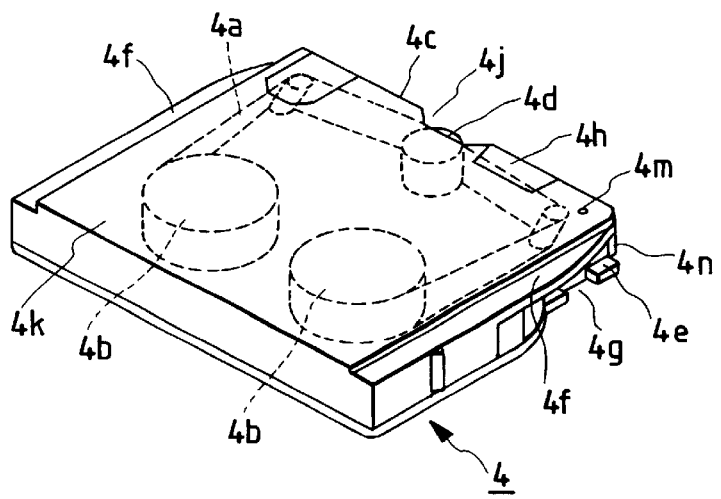
FIG. 6 is a perspective view of a cartridge used in the magnetic recording/reproducing apparatus.

As shown in FIG. 6, the cartridge 4 to be loaded into the apparatus 1 receives therein a magnetic tape 4a, which is wound round rotatable reels 4b, 4b.

A cutout portion 4j is formed centrally of a front side 4c of the cartridge 4, and a pinch roller 4d is disposed so that its outer peripheral portion partially overhangs the cutout portion 4j. The reels 4b, 4b rotate in interlock with rotation of the pinch roller 4d, thereby making it possible to wind up or wind back the magnetic tape 4a.

At both right and left outer side faces of the cartridge 4 are formed guide portions 4e and 4f in an up-and-down relation to each other to guide the cartridge 4 into the apparatus 1. The right and left lower guide portions 4e respectively have engaging grooves 4g formed by partially cutting out the guide portions.

On the right-hand side in the figure of the front side 4c of the cartridge 4 is disposed a lid 4h capable of being opened and closed. With the lid 4h open, the magnetic tape 4a is exposed.

At a position closer to the right-hand corner in the figure with respect to the position of the lid 4h there is disposed a support pin 4m which supports the lid pivotably. A torsion coil spring (not shown) is wound round the support pin 4m to urge the lid 4h in its closing direction resiliently at all times.

An end portion 4n of the lid 4h is projected on the right-hand side of the cartridge relative to the support pin 4m. When the end portion 4n is pressed from the front, the lid 4h turns around the support pin 4m to open the right-hand portion of the front side 4c of the cartridge 4.

As shown in FIG. 9, a motor mounting plate 5 is secured with bolts or the like to the bottom plate 2a of the housing 2, and an electric motor 6 for sliding the slide member 3 is mounted to the motor mounting plate 5. That is, the electric motor 6 is used as a drive source for sliding the slide member 3.

A pinion gear 6a is mounted on the shaft of the motor 6 and the rotation of the motor is transmitted to gears 7 via the pinion gear 6a. The gears 7 comprise a pinion gear 7a, a worm gear 7b integral with the pinion gear 7a, and pinion gears 7c, 7d each comprising two pinion gears of different diameters formed integrally with each other, which pinion gears and worm gear are in a mutually engaged state. The gears 7 thus constituted are fitted through respective shaft portions into apertures of a small diameter formed in the vicinity of the guide slot 2g.

Upon rotation of the motor 6, the rotational force is transmitted to a cam mechanism 8 having a spur gear 9 via the gears 7.

The cam mechanism 8 comprises a spur gear 9 and a cam plate 10. As shown in FIG. 7, the spur gear 9 is circular in external form and has a plurality of tooth threads 9a formed on its outer periphery. The gear of a smaller diameter in the pinion gear 7d is in mesh with the tooth threads 9a to transmit the rotation of the motor 9 to the cam mechanism 8.

A projection 9b of a generally triangular shape is formed on the surface of the spur gear 9 at a position close to the outer periphery of the surface.

Figure 7A:
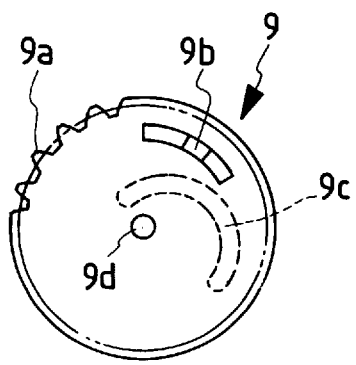
FIG. 7 comprises a front view, a side view and a bottom view of a spur gear used in the magnetic recording/reproducing apparatus.
Figure 7B:
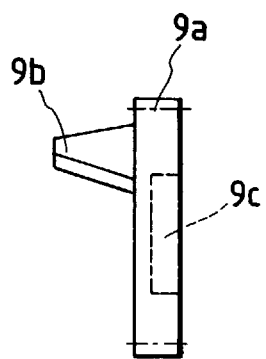
Figure 7C:
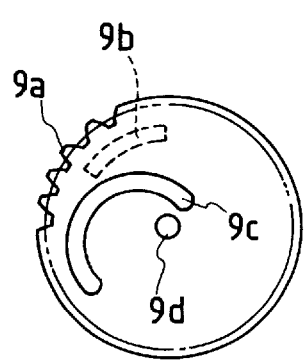

On the back side of the spur gear 9 is formed a cam groove 9c of a generally arcuate shape at predetermined width and depth in such a manner that the distance from the rotational center gradually becomes larger clockwise in FIG. 7A from near a central hole 9d up to near the tooth threads 9a formed on the outer periphery side.

In the cam mechanism 8, moreover, a rotatable cam plate 10, which converts the rotational motion of the spur gear 9 into a linear motion, is disposed between the spur gear 9 and the bottom plate 2a of the housing 2.

Figure 8:
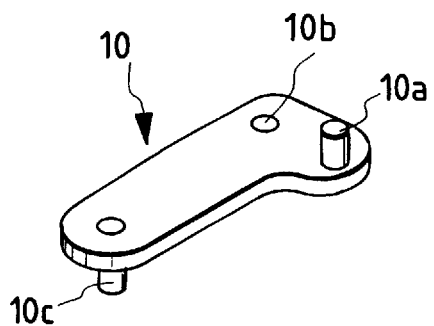
FIG. 8 is a perspective view of a cam plate used in the magnetic recording/reproducing apparatus.

As shown in FIG. 8, the, cam plate 10 has a generally L-shaped external form. On one side of the cam plate 10, a cam pin 10a of a circular section is projected upward at one end portion, and a support shaft 10b is projected downward at the rotational center of the cam plate. Further, at an end portion on the opposite side of the cam plate 10, a slide pin 10c of a circular section is projected downward in the same direction as the support shaft 10b. The cam pin 10, support shaft 10b and slide pin 10c are secured to the cam plate 10 by caulking and the like.

In the cam plate 10 of such a construction, the support shaft 10b is attached rotatably to the bottom plate 2a, as shown in FIG. 9. The slide pin 10c of the cam plate 10 is fitted through the arcuate guide slot 2g movably and its tip is inserted into the elliptical aperture 3h formed in the slide member 3.

The tip of the slide pin 10c projects downward through the aperture 3h and a washer (not shown) is caulked thereto. The slide member 3 is connected slidably to the tip of the slide pin 10c so as to prevent dislodgment thereof.

The cam pin 10a is slidably engaged with the cam groove 9c of the spur gear 9.

In the cam mechanism 8 of such a construction, when the spur gear 9 rotates in the counterclockwise direction, the cam pin 10a of the cam plate 10 moves in a direction away from the rotational center of the spur gear 9 following the contour of the cam groove 9c of the spur gear 9.

As a result, the cam plate 10 rotates counterclockwise about the support shaft 10b and the slide pin 10c moves in the arcuate guide slot 2g of the housing 2 in the direction of arrow E, causing the slide member 3 to slide in the arrow E direction.

As shown in FIG. 9, a magnetic head 11 is mounted within the head mounting hole 2e of the housing 2. At a predetermined position spaced from the magnetic head 11 is disposed a conveyance roller 12 for winding the magnetic tape 4a. With a motor (not shown) or the like as a drive source, the conveyance roller 12 is rotated clockwise and counterclockwise, thereby making it possible to wind up and wind back the magnetic tape 4a.

As shown in FIG. 1, the upper portion of the housing 2 is covered with a cover 17 to close the interior of the magnetic recording/reproducing apparatus 1. In a front portion of the apparatus 1 is formed a cartridge inlet 1a, through which the cartridge 4 can be conducted smoothly into the apparatus.

In the interior of the housing 2 shown in FIG. 9 are disposed cartridge guide members (not shown) for guiding the insertion of the cartridge 4 along the side plates 2b. In the cartridge guide member located on one side, an elongated opening member 13 for opening the lid 4h of the cartridge 4 is disposed slidably.

Figure 15:
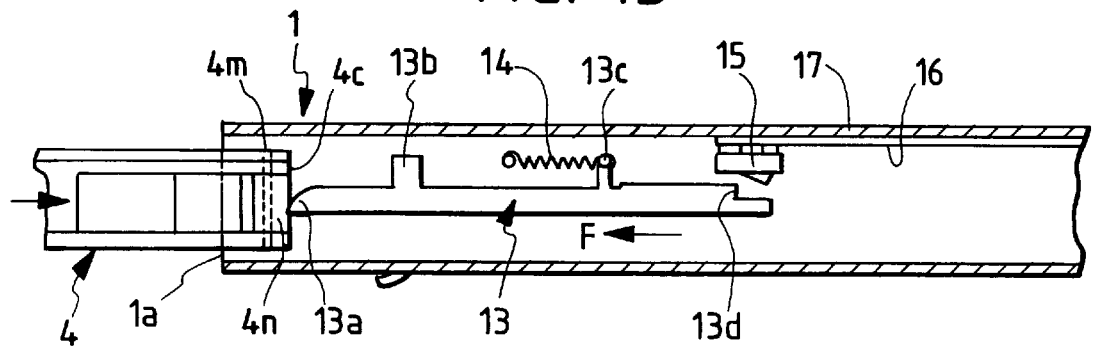
FIG. 15 is a sectional view of principal portions for explaining the operation of an opening member and that of a sensor at the beginning of cartridge loading in the magnetic recording/reproducing apparatus.

The opening member 13 is formed by molding and the like. As shown in FIG. 15, a lid opening portion 13a is formed arcuately at an end portion of the opening member 13 so as to be positioned near the cartridge inlet 1a of the apparatus 1.

The opening member 13 also has a pressing portion 13b projecting upward on the right-hand side in the figure of the lid opening portion 13a. When the cartridge 4 is inserted into the apparatus, the pressing portion 13b is pressed by an end portion on the front side 4c of the cartridge, whereby the opening member 13 is made slidable.

On the right-hand side of the pressing portion 13b is formed a coil spring retaining portion 13c, and at a rightmost end in the figure is formed a switch input portion 13d as a lower stepped portion.

One end of a coil spring 14 is anchored at the coil spring retaining portion 13c of the opening member 13, while the opposite end thereof is fixed to the cartridge guide member (not shown). Consequently, the slidable opening member 13 is urged resiliently in the direction of arrow F at all times by virtue of the coil spring 14.

Above the switch input portion 13d formed on the right-hand side of the opening member 13, a sensor 15, say, a push switch, is secured to a printed circuit board 16. When the opening member slides in the direction of arrow E and the switch input portion 13d pushes the detector 15 upward to turn ON the sensor, the sliding motion of the opening member 13 is detected by the sensor 15 and thus the insertion of the cartridge 4 can be detected.

The printed circuit board 16 is mounted with bolts or the like to mounting portions (not shown) formed by cutting and bending the side plates 2b of the housing 2. The printed circuit board 16 is also covered with the cover 17.

The operation of the magnetic recording/reproducing apparatus 1 of the above construction embodying the present invention will be described below with reference to FIGS. 9 to 19.

Figure 11:
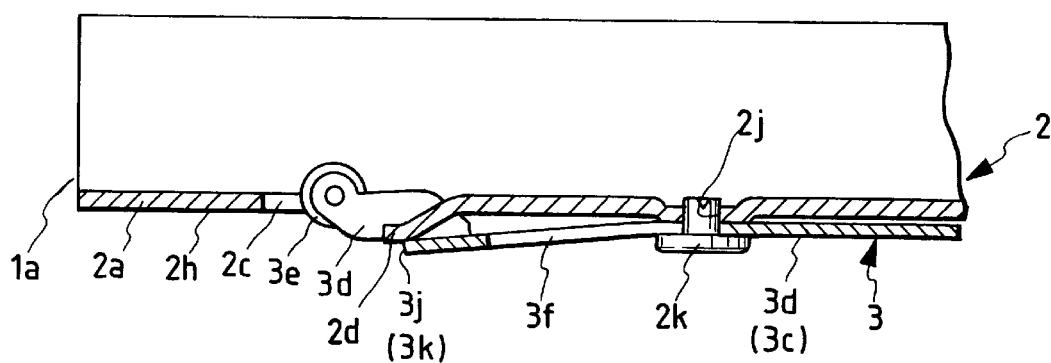
FIG. 11 is an explanatory view showing a relation between a slide plate and a cam portion in a waiting state for cartridge loading in the magnetic recording/reproducing apparatus.

In the apparatus 1 which is in a stand-by state before insertion of the cartridge 4, as shown in FIG. 11, the front ends 3j (3k) of the slide member 3 strike on the slants of the cam portions 2d projecting from the bottom plate 2a of the housing 2. Further, the roller holding portions 3d sink downward and the retaining rollers 3e are positioned approximately half within the openings 2c. The front ends 3j (3k) of the slide member 3 are moved up and down by the cam portions 2d, whereby the retaining rollers 3e as the foregoing retaining portions can be engaged with and disengaged from the engaging grooves 4g of the cartridge 4.

Thus, while the apparatus is in a stand-by state for the insertion of cartridge, the retaining portions of the slide member for engagement with the cartridge are displaceable in a direction orthogonal to the sliding direction of the slide member.

The following description is now provided about the operation for loading the cartridge into the apparatus 1.

First, the cartridge 4, which is indicated with a dash-double dot line in FIG. 9, is pushed in lightly in the direction of arrow E from the cartridge inlet 1a formed on the front side of the apparatus 1, by manual operation of the operator. As a result, the guide portions 4e and 4f formed on both right and left sides of the cartridge 4 are guided by the guide members disposed on both right and left sides in the interior of the housing 2, and the end portion 4n of the cartridge lid comes into abutment with the lid opening portion 13a of the opening member 13 in the interior of the housing 2, as shown in FIGS. 15 and 18.

Figure 18:
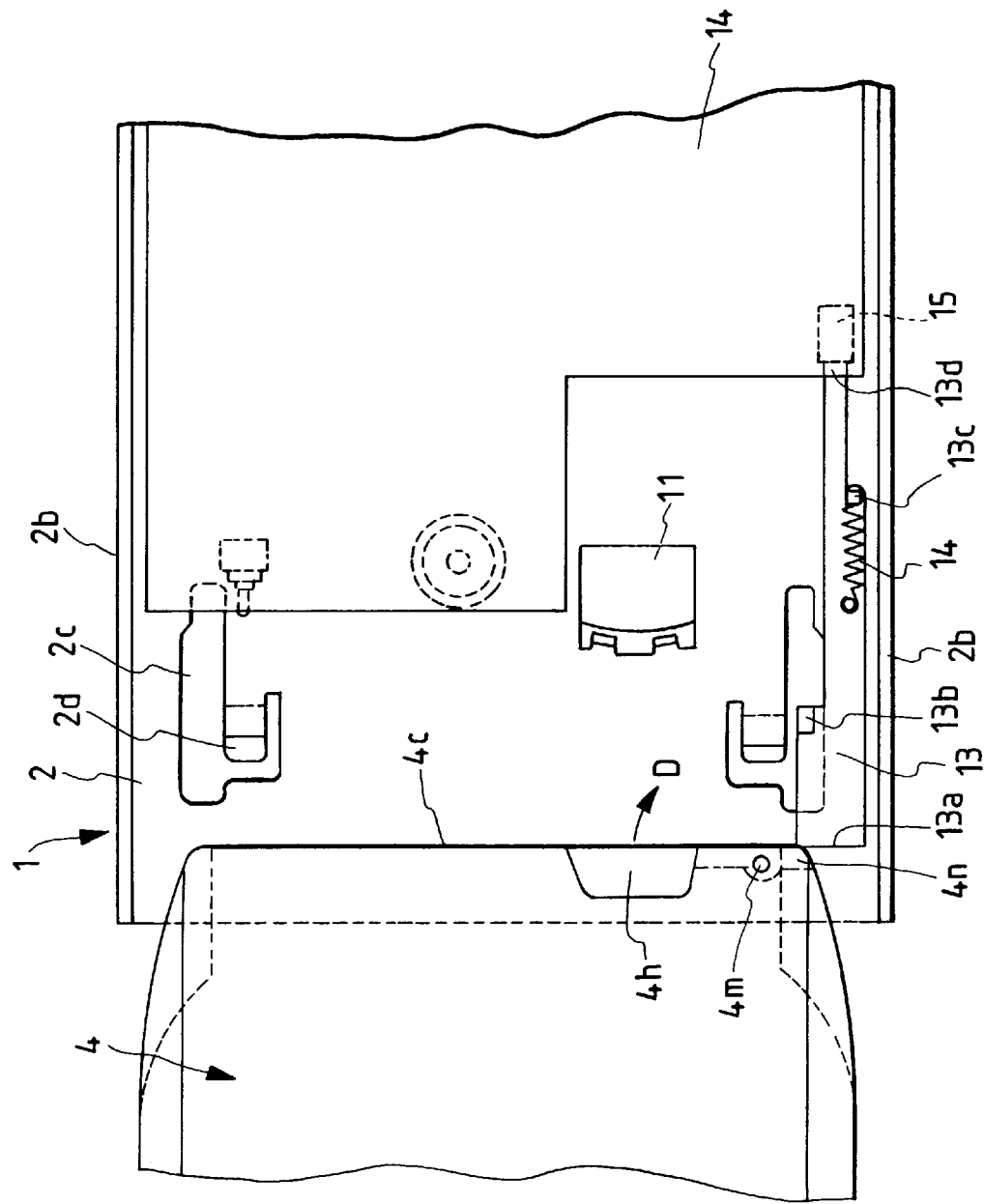
FIG. 18 is a plan view of principal portions for explaining the operation of the opening member and one of the sensor at the beginning of cartridge loading illustrated in FIG. 15.

With a further insertion of the cartridge 4 into the housing 2, the end portion 4n of the lid 4 is pressed against the lid opening portion 13a of the opening member 13 and turns in the direction of arrow D in FIG. 18 with the support pin 4m as fulcrum, so that the front side 4c of the cartridge 4 is opened partially.

Figure 12:
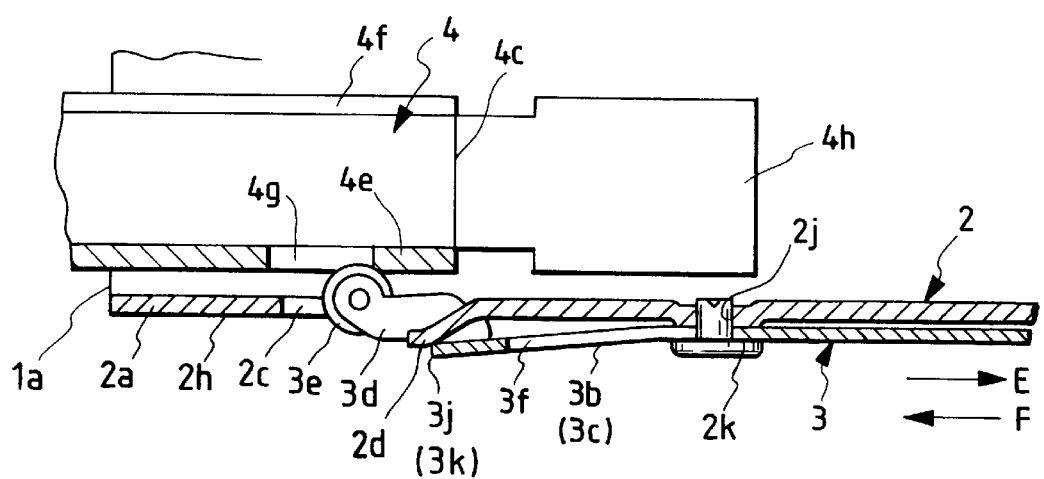
FIG. 12 is a sectional view of principal portions for explaining an engaged state of a roller with the cartridge at the beginning of cartridge loading in the magnetic recording/reproducing apparatus.

On the other hand, with the insertion of the cartridge 4, the front ends of the cartridge guide portions 4e strike against the retaining rollers 3e, as shown in FIG. 12. However, since the retaining rollers 3e are positioned on the lower side under the action of the cam portions 2d, the cartridge 4 can be further pushed into the apparatus 1 with a light force of small resistance. At this time, the retaining rollers 3e are somewhat depressed by the guide portions 4e.

Figure 19:
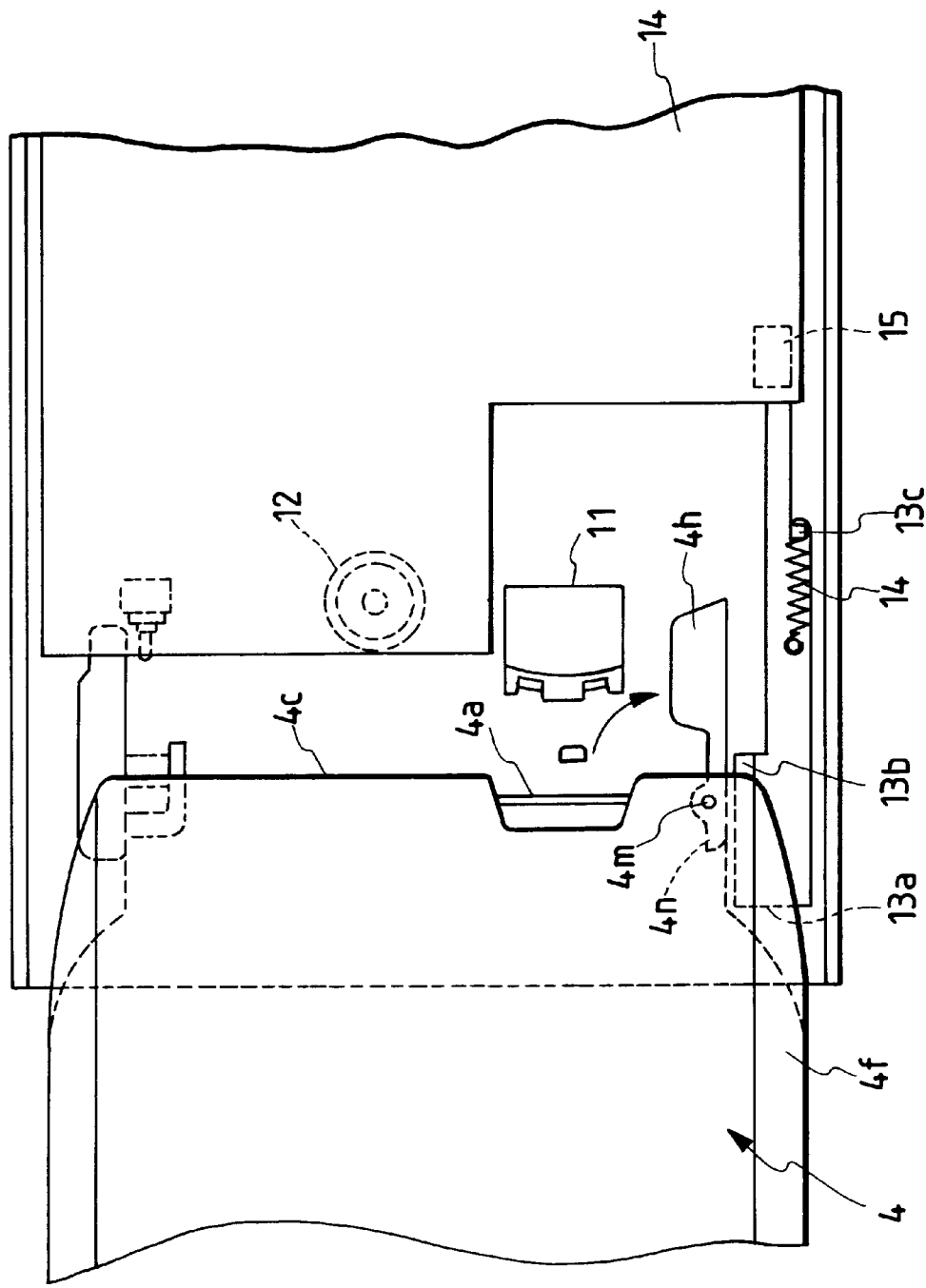
FIG. 19 is a plan view of principal portions for explaining the operation of the opening member and one of the sensor at the beginning of cartridge loading illustrated in FIG. 16.

As the cartridge 4 is further inserted into the housing 2, the lid 4h assumes a forwardly straight state with respect to the front side 4c of the cartridge and thus becomes parallel to the opening member 13, as shown in FIG. 19.

In this state, if the cartridge 4 is further inserted into the housing 2, the front side 4c of the cartridge comes into abutment with the pressing portion 13b of the opening member 13.

Figure 16:
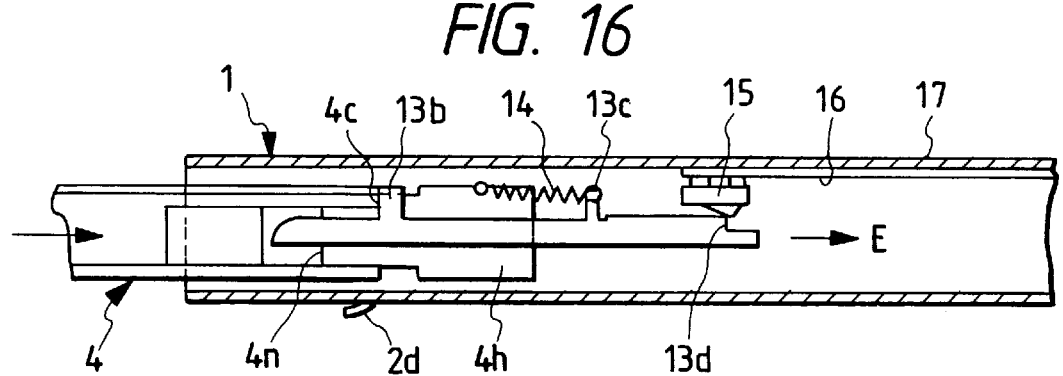
FIG. 16 is a sectional view of principal portions for explaining the operation of the opening member and one of the sensor at the beginning of cartridge loading in the magnetic recording/reproducing apparatus.

With a still further insertion of the cartridge 4 into the apparatus 1, as shown in FIG. 16, the opening member 13 moves, against the resilience of the coil spring 14, inwards together with the cartridge 4 and the switch input portion 13d of the opening member 13 turns ON the sensor 15 such as a push switch, attached to the printed circuit board 16 positioned above, to detect that the cartridge 4 has been inserted into the apparatus 1.

Thus, a further insertion of the cartridge 4 after opening of the lid causes the opening member 13 to slide, and this sliding motion is detected by the sensor 15 to detect that the cartridge 4 has been inserted.

Once the insertion of the cartridge 4 is detected by the sensor 15, the operation of the drive source 6 such as a motor for example is started.

At this time, the relation between the retaining rollers 3e as the retaining portions of the slide member 3 and the engaging grooves 4g of the cartridge 4 is such that the retaining rollers 3e come to be positioned in the engaging grooves 4g from their state shown in FIG. 12 in which the retaining rollers strike on ends of the guide portions 4e. Thus, the insertion of the cartridge 4 gives rise to a click feeling.

As soon as the retaining rollers 3e are positioned in the engaging grooves 4g of the cartridge 4, the sensor 15 is turned ON and the operation for inserting the cartridge 4 into the apparatus 1 is switched over from manual operation to electric drive using the drive source 6 such as a motor for example.

Thus, once the drive source 6 starts operating, the spur gear 9 of the cam mechanism 8 is rotated counterclockwise in FIG. 9 via gears 7, and the cam plate 10 rotates counterclockwise about the support shaft 10b while following the contour of the cam groove 9c of the spur gear 9.

As a result, the pin 10c of the cam plate 10 moves along the guides slot 2g of the housing 2 and the slide member 3 begins to move in the direction of arrow E.

Figure 13:
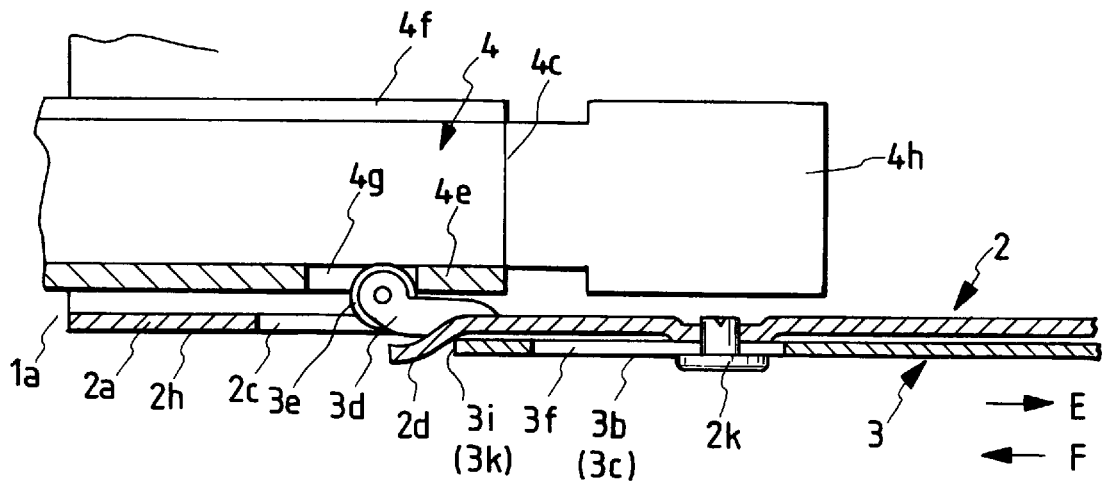
FIG. 13 is a sectional view of principal portions for explaining a roller-cartridge engaged state at the beginning of cartridge loading in the magnetic recording/reproducing apparatus.

Once the movement of the slide member 3 in the arrow E direction starts, as shown in FIG. 13, the front ends 3j (3k) of the slide member 3 slide down from the slants of the cam portions 2d of the housing 2, and the arm portions 3b, 3c become parallel to the back side of the bottom plate 2a by virtue of the resilience of the slide member 3.

In this state, the retaining rollers 3e of the slide member 3 are engaged completely in the engaging grooves 4g of the cartridge 4 to retain the cartridge. Further, as the slide member 3 slides in the arrow E direction, the cartridge 4 is pulled into the apparatus 1.

Next, when the spur gear 9 further rotates in the counterclockwise direction, the top of the apex of the triangular projection 9b of the spur gear turns ON a slide position detecting switch (not shown) which is provided on the printed circuit board 16 located above the spur gear and which is for detecting a slide position in the loading direction, with the result that the drive source 6 turns OFF. At this time, as shown in FIG. 10, the pin 10a on the cam plate 10 engaged in the cam groove 9c of the spur gear 9 is positioned approximately on the outermost periphery side, and the pin 10c, which is in an engagement anti-dislodgmentwise with the slide member 3, moves up to the outermost side in the arrow E direction of the guide slot 2g of the housing 2. When the slide member 3 has thus been pulled in up to the innermost part of the apparatus 1, the sliding motion of the slide member 3 in the arrow E direction stops.

With such a movement of the slide member 3 to the inner part of the apparatus 1, the pinch roller 4d of the cartridge 4 comes into abutment with the conveyance roller 12 disposed in the interior of the apparatus 1, and the magnetic tape 4a comes into sliding contact with the magnetic head 11.

Figure 17:
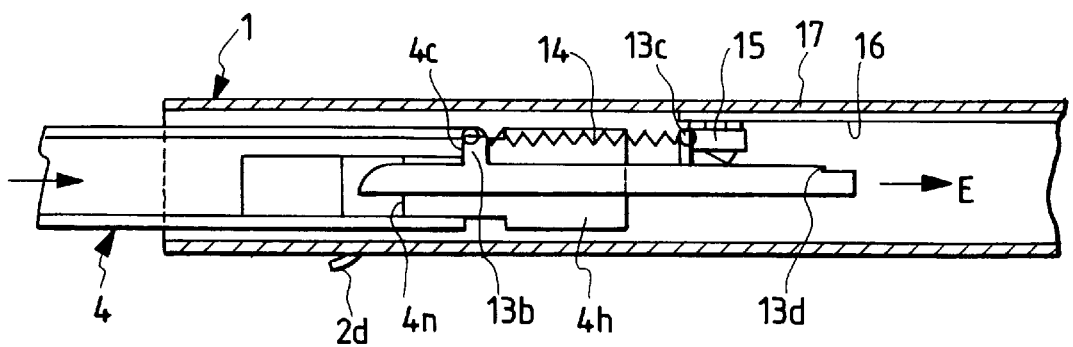
FIG. 17 is a sectional view of principal portions for explaining the operation of the opening member and one of the sensor at completed loading of the cartridge in the magnetic recording/reproducing apparatus.

When the cartridge 4 is pulled in by the drive source 6, as shown in FIG. 17, the opening member 13 is pulled in the arrow E direction together with the cartridge, and the coil spring 14 is in a stretched state, while the sensor 15 remains ON.

As mentioned above, the cartridge 4 comes into abutment with the conveyance roller 12 and its sliding motion stops. To be more specific, the slide member 3 moves a little more in the arrow E direction and then stops in order to prevent slippage with respect to the pinch roller.

Figure 14:
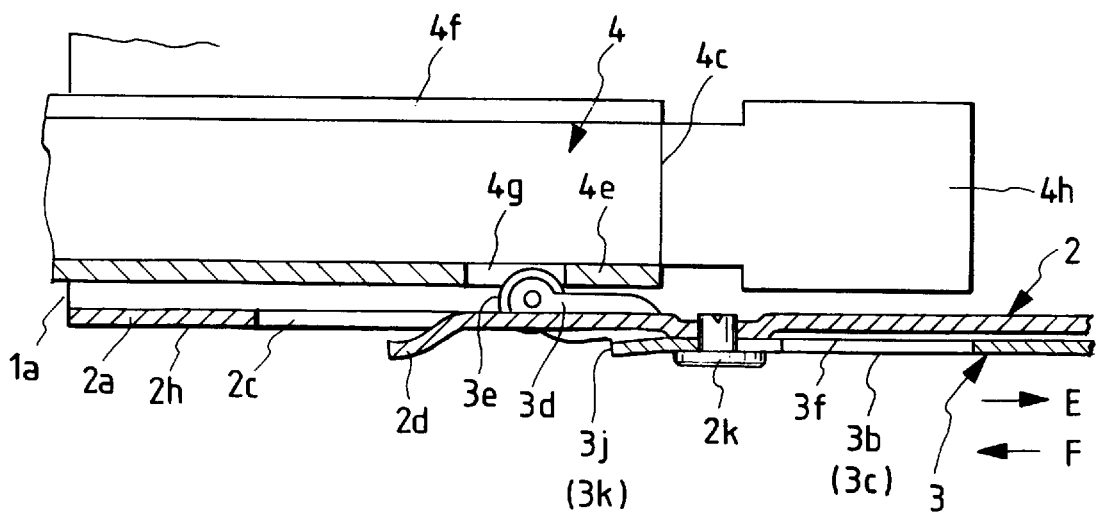
FIG. 14 is a sectional view of principal portions for explaining a roller-cartridge engaged state at completed loading of the cartridge in the magnetic recording/reproducing apparatus.

Therefore, as shown in FIG. 14, the retaining rollers 3e of the slide member 3 somewhat strike on the side walls of the guide portions 4e with the engaging grooves 4g formed therein and are located at lower positions to retain the cartridge 4.

Once the sliding motion of the cartridge 4 and that of the slide member 3 stops, recording and reproduction for the magnetic tape 4a can be done any time in accordance with a command issued from an external computer (not shown) for example.

When the loading of the cartridge 4 is over, the rear end portion of the cartridge is exposed to the extent that it can be held by the operator, as shown in FIG. 2.

Thus, in the apparatus 1 of this embodiment, by only the sliding motion of the slide member 3 toward the inner part of the apparatus, the cartridge 4 can be loaded into the apparatus 1 and positioned and held therein.

The following description is now provided about an eject operation for taking out the cartridge from the inside of the apparatus 1. In accordance with an eject command issued from an external computer (not shown) or the like, the drive source 6 is turned ON and is rotated in the direction opposite to the rotational direction in the loading of the cartridge 4, thereby causing the spur gear 9 to rotate clockwise from its state shown in FIG. 10.

Further, the cam plate 10 is rotated clockwise and the pin 10c is moved in the arrow F direction, thus causing the slide member 3 to slide toward the cartridge inlet 1a (in the arrow F direction). The slide member 3 and the cartridge 4 are returned to their positions shown in FIGS. 9 and 12.

As a result, the apex of the triangular projection 9b of the spur gear 9 turns ON a slide position detecting switch (not shown) which is provided on the printed circuit board 16 and which is for detecting a slide position in the eject direction, resulting in that the rotation of the drive source 6 is stopped to stop the movement in the arrow F direction of the slide member 3.

Then, as shown in FIG. 15, the cartridge 4 moves to the front side of the apparatus 1 relative to the position where the sensor 15 turns ON, with the resilience of the coil spring 14 which is anchored at the opening member 13. In this state, the retaining rollers 3e of the slide member 3 are in a temporarily engaged state in the engaging grooves 4g of the cartridge 4, as shown in FIG. 12, so that the cartridge can be easily taken out from the apparatus 1 manually and with a light force.

Upon completion of the cartridge extracting operation, the apparatus 1 assumes a stand-by state waiting for insertion of the cartridge 4.

If the motor 6 as the drive source or the cam mechanism 8 fails during the cartridge eject operation from the apparatus 1 and the cartridge 4 is left behind within the apparatus, the operator is required to pull out the cartridge while holding a rear side 4K of the cartridge, whereby the holding portions 3d are deflected downward and hence the cartridge can be taken out. Thus, the cartridge 4 is employable without any trouble.

If a resilient member for urging the cartridge 4 in a direction to eject it to the exterior of the apparatus 1 is provided separately and the cartridge is ejected by the resilient member, it is possible to further improve the operability.

Figure 20:
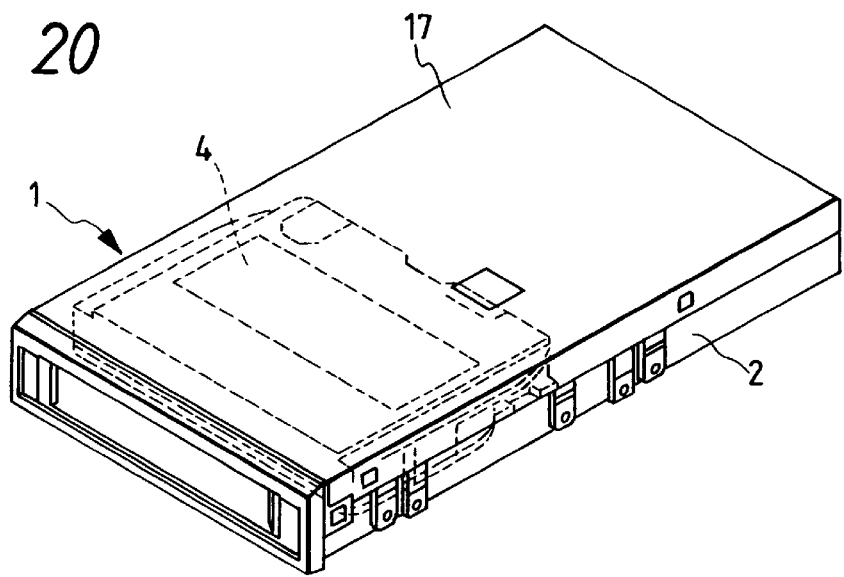
FIG. 20 is an explanatory view showing a completed state of cartridge loading in a magnetic recording/reproducing apparatus according to another embodiment of the present invention.

Referring now to FIG. 20, there is illustrated another embodiment of the present invention, in which the whole of the cartridge 4 is loaded completely into the housing 2. In this case, there is no portion of the cartridge 4 projecting from the apparatus 1 to the exterior and therefore there is no fear of, for example, the operator's hand striking against the cartridge by mistake which would cause a deviation in the abutment position between the tape and the head. Further, in applications not requiring frequent replacement of cartridge, particularly in a data backup unit of a computer, the cartridge may be left loaded in the apparatus over a long period. Even in such a case, this embodiment permits suppressing the deterioration of performance caused by the entry of dust or the like. Thus, it is possible to effect recording and reproduction with a high reliability.

Figure 21:
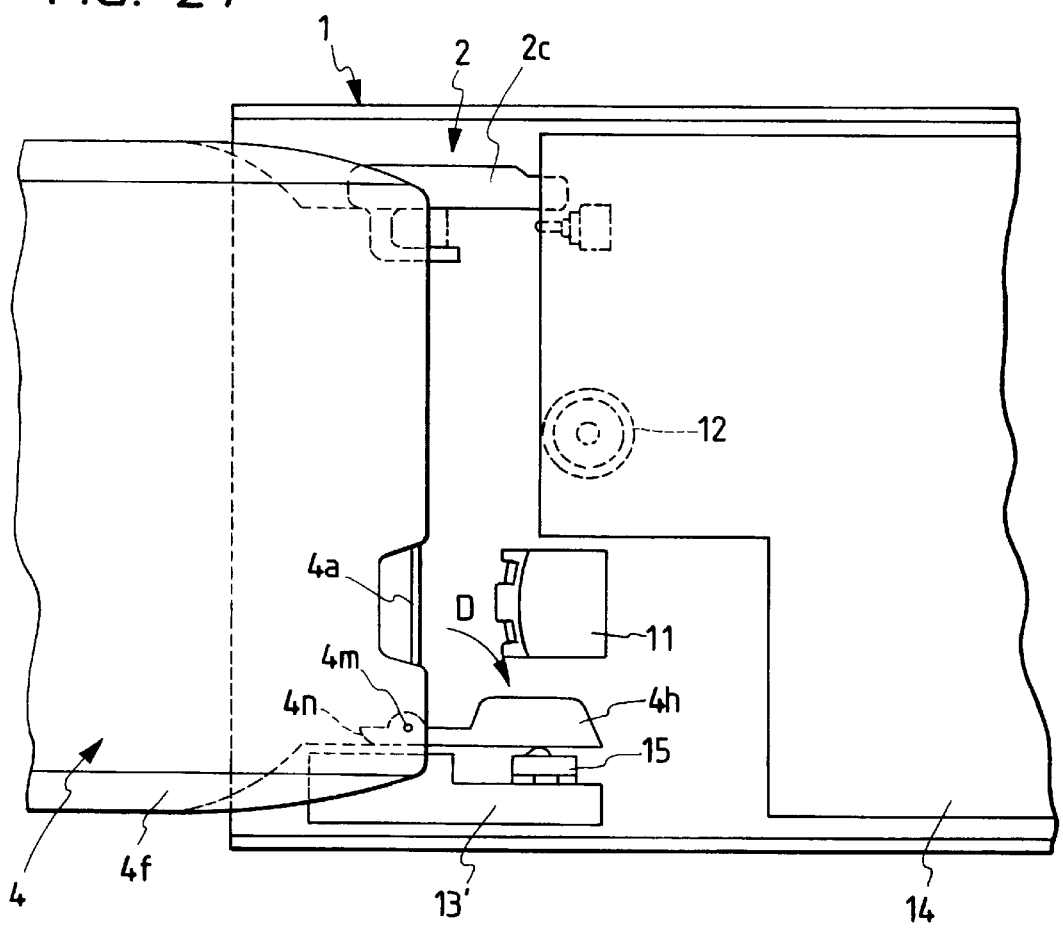
FIG. 21 is a plan view of principal portions for explaining the operation of a cartridge sensor used in a magnetic recording/reproducing apparatus according to a further embodiment of the present invention.
Figure 22:
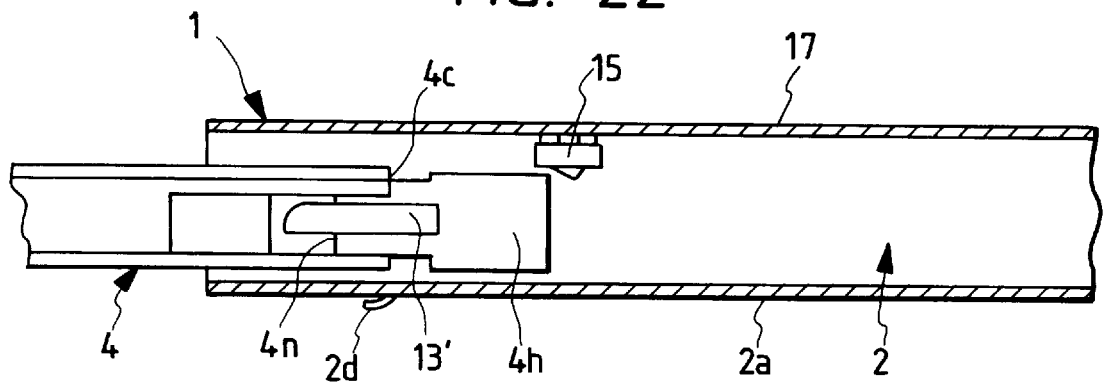
FIG. 22 is a sectional view of principal portions for explaining the operation of a cartridge sensor used in a magnetic recording/reproducing apparatus according to a still further embodiment of the present invention.

Referring now to FIGS. 21 and 22, there is illustrated a further embodiment of the present invention in which the body of a cartridge is detected directly and then the loading of the cartridge is started.

In the embodiment illustrated in FIG. 21, an opening member 13' is formed integrally with a cartridge guide member (not shown) which is fixed in the interior of the housing 2 to guide the insertion of a cartridge 4. A sensor 15 is attached to the opening member 13' in an opposed relation to an opening position of a lid 4h of the cartridge 4.

When the cartridge 4 is inserted into the apparatus 1 of such a construction and the lid 4h is opened by the fixed opening member 13', the surface of the lid 4h pushes ON the sensor 15 attached to the opening member 13 and constituted by a push switch or the like, whereby it is detected that the cartridge 4 has been inserted into the apparatus. Then, a drive source 6 such as a motor is turned ON.

The sensor 15 may be attached to an upper case 17 or printed circuit board 16, as shown in FIG. 22. According to this construction, when the cartridge 4 is further inserted into the apparatus 1 after the lid 4h has been opened by the opening member 13', an upper end portion of the lid 4h pushes ON the sensor 15.

By turning ON of the sensor 15 it is detected that the cartridge 4 has been inserted into the apparatus, whereupon the operation of the drive source such as a motor is started to perform the loading operation.

Thus, since the sensor is provided correspondingly to the lid opening position of the cartridge, it is possible to surely detect insertion of the cartridge and opening of the lid without using any other separate member.

Figure 23:
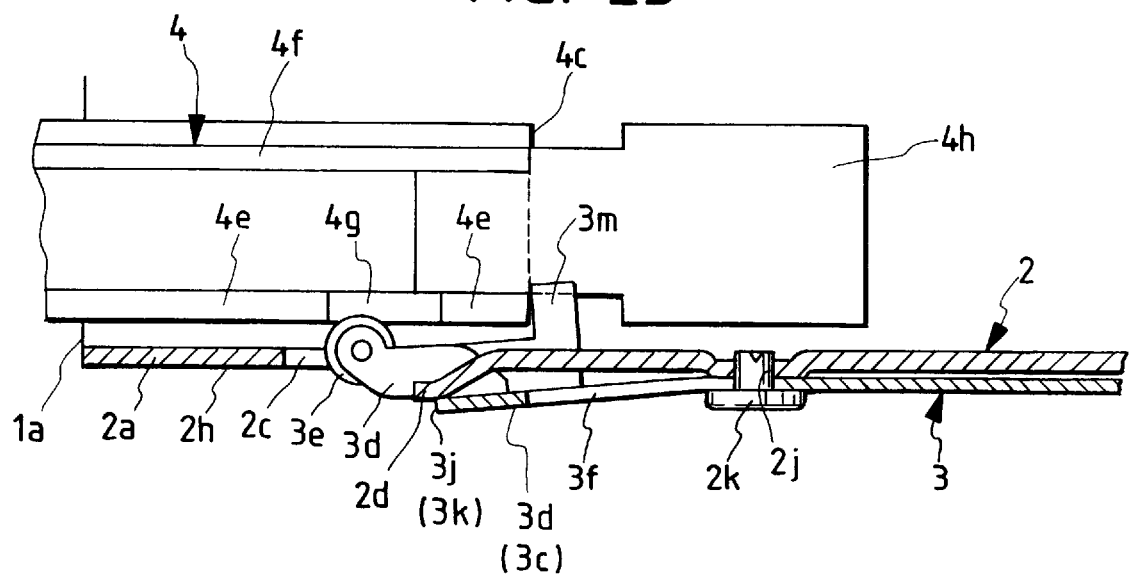
FIG. 23 is a sectional view of principal portions for explaining the operation of a stopper member used to prevent overrunning of a cartridge in a magnetic recording/reproducing apparatus according to a still further embodiment of the present invention.
Figure 24:
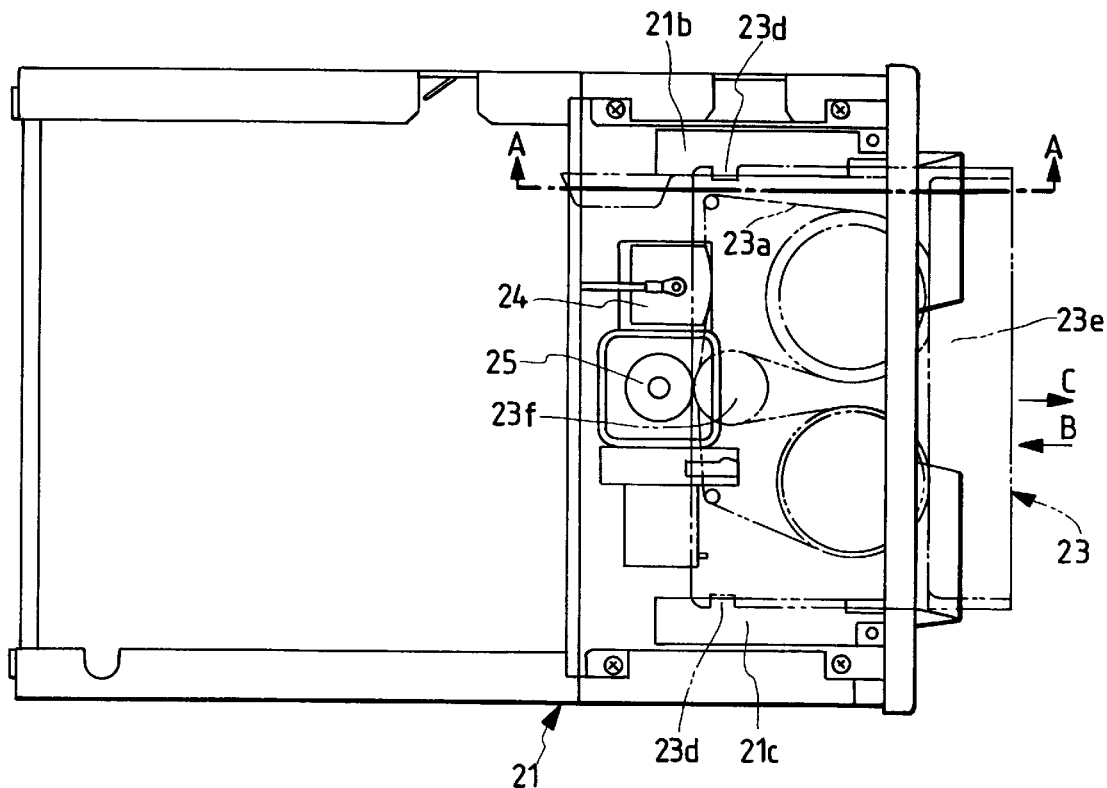
FIG. 24 is a plan view of principal portions for explaining a loaded state of a cartridge into a conventional magnetic recording/reproducing apparatus.
Figure 25A:
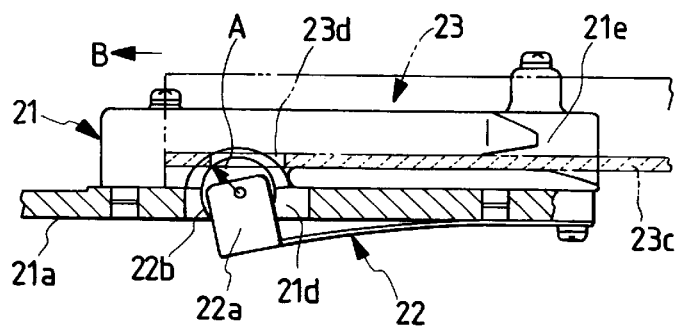
FIG. 25 comprises a sectional view of principal portions and a side view of principal portions for explaining the cartridge loaded state in the conventional magnetic recording/reproducing apparatus.
Figure 25B:
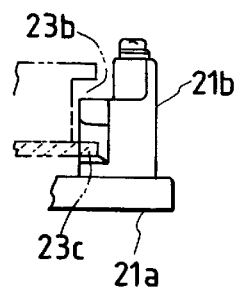

Now, with reference to FIG. 23, a description is directed to a magnetic recording/reproducing apparatus according to a still further embodiment of the present invention which apparatus is provided with stoppers for preventing the overrun of a cartridge at the time of insertion of the cartridge.

In the apparatus of this embodiment, a slide member 3 is integrally formed with stopper portions 3m by press working so as to be located at a more inside position than roller holding portions 3d and higher than retaining rollers 3e of the slide member 3.

The stopper portions 3m are formed so that they can stop insertion of a cartridge 4 at a position where the retaining rollers 3e are engaged in retaining grooves 4g of the cartridge 4.

During the manual insertion of the cartridge 4 into the apparatus, there may occur an overrun of the cartridge 4 being pushed too much into the apparatus 1 with the force of inertia. However, the tips of guide portions 4e of the cartridge 4 come into abutment with the stopper portions 3m of the slide member 3, whereby the movement of the cartridge 4 into the housing 2 is stopped.

Thus, it is unlikely at all that the cartridge 4 will be pushed excessively into the apparatus 1 and that the retaining rollers 3e once engaged in the engaging grooves 4g will come off the same grooves and stop while striking on the surfaces of the guide portions 4e located on the rear side of the cartridge. It is, therefore, possible to effect the loading of the cartridge positively. Besides, there is no fear of an increase of the motor load at the beginning of the loading.

In the magnetic recording/reproducing apparatus of the present invention, as set forth hereinabove, since the slide member is brought into engagement with engaging portions of a cartridge, allowing the cartridge to slide and be loaded to and ejected from the apparatus with sliding motions of the slide member, the cartridge can be loaded to and ejected from a recording/reproducing position of the apparatus easily and securely.

Further, by operating the slide member with use of an electric drive source, it becomes possible to effect an automatic loading of the cartridge and hence possible to provide a magnetic recording/reproducing apparatus superior in operability.

What is claimed is:

1. A magnetic recording/reproducing apparatus comprising:
   a slide member for moving a cartridge with a magnetic tape received therein between an inserted position and a loaded position with respect to the apparatus; and
   a housing for holding said slide member, said housing having cam portions to displace said slide member into engagement or disengagement with said cartridge, said cam portions formed integrally with said housing by projecting portions of the housing downward,
   wherein the moving of said cartridge between the inserted position and the loaded position is effected by sliding said slide member in an engaged state thereof with said cartridge, and
   further wherein said slide member is held slidably with respect to said housing and in such a manner that engaging portions can be engaged or disengaged with the cartridge in a direction orthogonal to the sliding direction when the slide member lies on an inlet side of said cartridge, said engaging portions comprising retaining portions formed as protuberances on a side of the slide member for engaging grooves formed on the inlet side of the cartridge, said retaining portions being displaceable vertically with respect to the sliding direction.

2. A magnetic recording/reproducing apparatus according to claim 1, wherein the retaining portions of said slide member comprise rollers supported on one end side of the slide member.

3. A magnetic recording/reproducing apparatus according to claim 2, wherein when said rollers are positioned on the lower side with a vertical motion of said slide member, the rollers come into contact with end portions of said engaging grooves of the cartridge to lock the cartridge temporarily.

4. A magnetic recording/reproducing apparatus according to claim 1, wherein said apparatus further comprises an electric drive means for sliding said slide member, said electric drive means including an electric drive motor and a rotary cam mechanism connected thereto, wherein said slide member is slidably driven by said rotary cam mechanism.

5. A magnetic recording/reproducing apparatus comprising:
   a slide member for moving a cartridge with a magnetic tape received therein between an inserted position and a loaded position;
   electric drive means for sliding said slide member;
   a housing for holding said slide member in a slidable manner; and
   a sensor means for detecting that the cartridge has been inserted into said housing,
   wherein said housing is provided with an opening member for opening a lid of said cartridge in a slidable manner, said opening member being allowed to slide with a further inserting motion of said cartridge after the cartridge had been inserted and the lid thereof opened by said opening member, sliding motion of said opening member is detected by said sensor means, and upon detection of the inserted state of said cartridge, said electric drive means is operated to start sliding said slide member for completing the loading of the cartridge.

6. A magnetic recording/reproducing apparatus according to claim 5, wherein said electric drive means comprises a motor and a rotary cam mechanism, said slide member being slidably driven by said rotary cam mechanism.

7. A magnetic recording/reproducing apparatus according to claim 5, wherein said opening member comprises a lid opening portion configured to engage an end portion of the lid of said cartridge and to open said lid when said cartridge has been inserted.

8. A magnetic recording/reproducing apparatus comprising:

a loading and unloading mechanism which makes it possible for a cartridge with a magnetic tape received therein to be loaded and unloaded with respect to the apparatus;

a slide member capable of engaging said cartridge; and a housing for holding said slide member, said housing having cam portions to displace said slide member into engagement or disengagement with said cartridge, said cam portions formed integrally with said housing by projecting portions of the housing downward, wherein said slide member is held slidably with respect to said housing and in such a manner that engaging portions can be engaged or disengaged with the cartridge in a direction orthogonal to the sliding direction when the slide member lies on an inlet side of said cartridge, said engaging portions comprising retaining portions formed as protuberances on a side of the slide member for engaging grooves formed on the inlet side of the cartridge, said retaining portions being displaceable vertically with respect to the sliding direction, and further wherein said slide member is provided with a stopper mechanism for stopping the cartridge at a position of engagement with the slide member upon insertion of the cartridge into the apparatus and which stopper mechanism, when the slide member is pulled in, permits movement of the cartridge while maintaining the engaged state of the cartridge with the slide member.

9. A magnetic recording/reproducing apparatus according to claim 8, wherein said retaining portions of said slide member comprise rollers supported on one end side of the slide member, and further wherein said stopper mechanism comprises stoppers formed on said slide member at positions near said rollers, said stoppers being positioned higher than said rollers.

* * * * *